United States Patent [19]

Panandiker et al.

[11] 4,055,550
[45] Oct. 25, 1977

[54] CONTINUOUS PROCESS FOR THE PRODUCTION OF PARTIALLY BLOCKED ISOCYANATES

[75] Inventors: K. A. Pai Panandiker, Maple Grove, Minn.; David E. Tweet, Carpentersville, Ill.

[73] Assignee: Cargill, Incorporated, Minneapolis, Minn.

[21] Appl. No.: 748,496

[22] Filed: Dec. 8, 1976

[51] Int. Cl.² .............................................. C08G 18/02
[52] U.S. Cl. .................... 260/77.5 AA; 260/77.5 AT; 260/77.5 TB
[58] Field of Search ................. 260/77.5 TB, 77.5 AT, 260/77.5 AA

[56] References Cited
U.S. PATENT DOCUMENTS

| | | | |
|---|---|---|---|
| 3,393,177 | 7/1968 | Guest et al. | 260/77.5 TB |
| 3,718,622 | 2/1973 | Camilleri et al. | 260/77.5 AN |
| 3,846,378 | 11/1974 | Griswold | 260/77.5 TB |

*Primary Examiner*—Eugene C. Rzucidlo
*Attorney, Agent, or Firm*—Fitch, Even, Tabin & Luedeka

[57] ABSTRACT

A method for manufacturing partially blocked isocyanate curing agents in which a polyisocyanate and a blocking agent for the polyisocyanate are separately and continuously metered into a reaction zone in predetermined nonstoichiometric proportion under reaction conditions, and in which the reaction mixture is continuously withdrawn from the reaction zone to provide a partially blocked isocyanate curing agent product. The partially blocked isocyanate curing agent product may be continuously reacted with a polyhydroxy resin coating precursor at a temperature below the unblocking temperature of the blocking agent in respect of the polyisocyanate to provide a heat curable powder coating composition.

11 Claims, 1 Drawing Figure

U.S. Patent
Oct 25, 1977
4,055,550
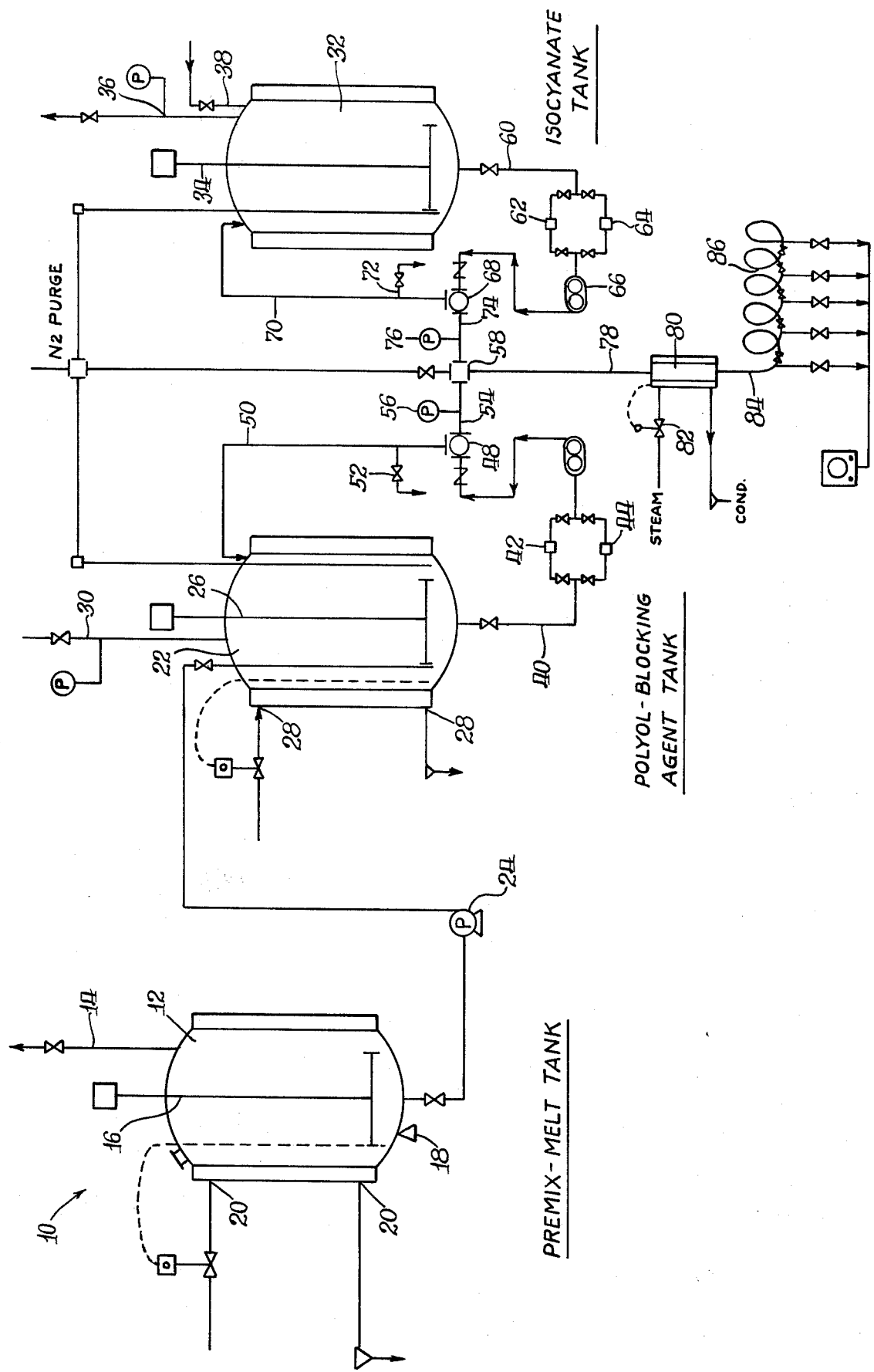

CONTINUOUS PROCESS FOR THE PRODUCTION OF PARTIALLY BLOCKED ISOCYANATES

The present invention is directed to the manufacture of curing agents, and, more particularly, is directed to the production of partially blocked isocyanate curing agents which are particularly useful in the provision of heat curable powder coating compositions.

Powder coating compositions and techniques have conventionally been used in the provision of protective films, and powder coating technology is becoming increasingly important for both economic and environmental reasons. Powder coating technology includes fluidized bed sintering techniques (such as electrostatic fluidized bed coating) and spray coating methods (such as electrostatic powder coating) which may be used or adapted for use with the various types of powder coating compositions. The compositions themselves may desirably be adapted and formulated to be, initially, sufficiently fluid to be capable of forming a film on the substrate under the coating conditions. The film may be subsequently curable by further polymerization and/or crosslinking.

Suitably formulated coating compositions may comprise a mixture of a prepolymer (or polymer) having reactive groups such as hydroxyl groups, and a curing agent which is reactive with the polymer. Conventional curing agents for polymers or prepolymers having reactive hydroxyl groups include polyfunctional "blocked" or "partially blocked" isocyanate crosslinking agents in which the isocyanate groups are reacted with a blocking agent capable of splitting off at elevated curing temperatures to regenerate isocyanate functionality. The regenerated isocyanate groups may in turn react with the hydroxyl groups of the polymer to cure the film.

Blocked isocyanate prepolymer curing agents are conventionally prepared by reacting the polyisocyanate prepolymer with a suitable blocking agent, such as a lactam or a ketoxime. Lactam and ketoxime blocked isocyanate curing agents are conventionally produced in a batch-wise process in which a polyol, such as trimethylol propane, and a stoichiometric excess of a polyisocyanate, such as isophorone diisocyanate, are reacted to produce urethane prepolymers of suitable molecular weight and composition and having terminal, unreacted isocyanate groups. These urethane prepolymers with free isocyanate groups conventionally may be further reacted in a batch processing reaction vessel with a blocking agent such as epsilon caprolactam or methyl ethyl ketoxime to produce the desired curing agents. Suitable reaction catalysts are conventionally used to promote the reactions, and are well known in the art [e.g., "Metal Organic Catalysts" by J. W. Britain et al., J. App. Polymer Science, Volume 4, p. 207 (1960)].

However, while substantial progress has been made in the art of powder coatings, further development, particularly including development of improved methods of manufacturing partially blocked polyisocyanate functional powder coating compositions, would be desirable.

Accordingly, it is an object of the present invention to provide improved methods for manufacturing partially blocked isocyanate curing agent materials, and it is a further object to provide such methods which may be utilized in the manufacture of partially blocked isocyanate — hydroxy functional polymer coating compositions.

These and other objects of the present invention will become apparent to those skilled in the art in view of the following detailed description and the accompanying drawing, of which FIG. 1 is a schematic representation of apparatus adapted to carry out an aspect of the present invention.

Generally, the present invention is directed to a method for continuously manufacturing partially blocked isocyanate curing agents which are the reaction products of a blocking agent and a polyfunctional isocyanate or polyisocyanate prepolymer. In accordance with the method, the blocking agent and polyisocyanate reactants are simultaneously metered in a predetermined stoichiometric excess of free isocyanate functionality to blocking agent functionality and continuously mixed and conducted into a reaction zone where the reaction mixture is maintained at a reaction temperature in the range of from about 280° F to about 400° F, and preferably above the unblocking temperature of the blocking agent. By "stoichiometric excess" is meant an excess of isocyanate functional groups over the stoichiometric ratio of one mole equivalent of free isocyanate functionality to one mole equivalent of blocking agent functionality. Generally, the metered stoichiometric excess should be in the range of from about 25 percent to 400 percent of free isocyanate functionality, so as to provide a molar equivalent ratio of free isocyanate functionality to blocking agent functionality in the range of from about 5:1 to about 5:4 (i.e., 20% to 80% blocking of free isocyanate groups). Preferably, the stoichiometric excess will be in the range of from 25 percent to 100 percent to provide a molar equivalent ratio in the range of from about 2:1 to 5:4 (i.e., 50% to 80% blocking). The reactants are maintained in the reaction zone and are reacted for a sufficient time to reduce the free isocyanate content of the reaction product to at least a predetermined level indicating substantial completion of reaction with the blocking agent, and the reaction mixture is continuously withdrawn from the reaction zone to provide a high quality partially blocked polyisocyanate curing agent product. The partially blocked reaction product should have from about 5 to about 20 percent by weight of unreacted isocyanate groups, and preferably from about 8 to about 12 percent by weight of unreacted isocyanate functionality. As indicated, the isocyanate blocking reaction is preferably carried out for at least a portion of the reaction time at a temperature above the unblocking temperature of the blocking agent with respect to the isocyanate, and may desirably utilize a residence reaction time of from about 15 to about 60 seconds at such temperature. The unblocking temperature is a function of both the isocyanate and the blocking agent, and the unblocking temperature for specific combinations of components may be readily determined. In this connection, the unblocking temperature for toluene diisocyanate (TDI) - epsilon caprolactam is about 320° F, for TDI-methyl ethyl ketoxime is about 280° F, for isophorone diisocyanate (IPDI) - epsilon caprolactam is about 360° F and for IPDI-methyl ethyl ketoxime is about 320° F. Partially blocked polyisocyanate may also be made below the unblocking temperature of the blocking agent with a longer residence time in the range of, say, from about 120 to about 150 seconds.

As indicated, the reactants are polyfunctional isocyanates and blocking agents for said polyfunctional isocyanates. The polyfunctionalisocyanates utilizable in the preparation of blocked curing agents are well known, and may include conventional aliphatic and aromatic polyisocyanates (including polyisocyanate-polyol prepolymers) having at least two isocyanate groups. Particularly preferred isocyanates are 3-isocyanatomethyl-3,5,5 trimethylcyclohexylisocyanate, which is more commonly referred to as isophorone diisocyanate or "IPDI", and toluene diisocyanate, which is also known as "TDI". Other aromatic, aliphatic, cycloaliphatic and arylaliphatic polyisocyanates such as hexamethylene diisocyanate, 4,4' diisocyanatodiphenyl methane and 4,4' methylene bis-(cyclo hexyl isocyanate) are also contemplated. Isocyanate prepolymers formed from a predetermined stoichiometric excess of a polyisocyanate and a polyol are particularly preferred polyfunctionalisocyanate reactants for the present process. In this connection, the polyol reacts with the polyisocyanate to provide a prepolymer with urethane linkages, and the molecular weight of the prepolymer can generally be controlled by varying the specific ratio of isocyanate and polyol components employed. Polyols having a hydroxyl functionality of more than two may be advantageously used to increase the isocyanate functionality of the resulting prepolymer, particularly in the case of diisocyanates, which enhances the crosslinking capability of the resulting partially blocked polyisocyanate prepolymer curing agent. Suitable polyol compounds for partially blocked polyisocyanate curing agent compounds are also well known to those skilled in the art. Particularly preferred polyols include trimethylol propane, which may be reacted with a stoichiometric excess of a difunctional isocyanate such as isophorone diisocyanate to provide a trifunctional isocyanate prepolymer having internal urethane linkages which are advantageous for various types of coating compositions. Other suitable polyols such as alkylene glycols and other aliphatic diols and polyols (e.g., mixtures of pentaerithritol and ethylene glycol), polycaprolactones (e.g., PCP0300 product of Union Carbide), trimethylol ethane, tris(hydroxy ethyl) isocyanurate and mixtures thereof are also contemplated.

When it is desired to use a polyol-polyisocyanate prepolymer as the polyfunctionalisocyanate compound of the partially blocked curing agent, the prepolymer may either be preformed, or its isocyanate and polyol components may be simultaneously metered in the desired equivalent ratio into the reaction zone together with the blocking agent, the amount of the blocking agent introduced into the reaction zone of course being based on the "free" isocyanate functionality of the polyolpolyisocyanate prepolymer, rather than on the isocyanate before reaction with the prepolymer. By "free" isocyanate functionality in this context is meant the excess isocyanate mole equivalent functionality of the metered reactants which is left after subtracting the polyol hydroxyl mole equivalent functionality.

Suitable blocking agents for the polyfunctionalisocyanates include ketoximes and lactams. These classes of blocking agents are well known in connection with isocynate curing agents. Particularly preferred blocking agents are epsilon caprolactam and methyl ethyl ketoxime and mixtures thereof.

The indicated method will provide a high quality partially blocked polyisocyanate prepolymer curing agent composition of uniform composition additionally having unreacted isocyanate functionality which may be selectively reacted with a polyhydroxy functional coating composition prepolymer to provide a heat curable coating composition. In this connection, the partially blocked isocyanate curing agent may be continuously mixed and introduced into an elevated temperature, high shear reaction zone (such as provided by an extruder) with a hydroxy functional coating composition polymer and reacted therewith at an effective reaction temperature below the unblocking temperature of the blocking agent. Other coating composition ingredients, such as pigments and flow control agents may also be included. The resulting product may be ground or otherwise comminuted to produce a heat curable high quality, powder coating material of uniform composition.

The present invention will now be particularly described with reference to the drawing of FIG. 1, which represents a schematic illustration of apparatus 10 adapted to carry out an embodiment of the present invention.

In the apparatus of FIG. 1, a premix melt tank 12 is provided with appropriate venting 14, mixing 16, loading 18 and steam service 20 apparatus. A suitably proportioned mixture of the blocking agent component and the polyol component may be introduced into and mixed in the premix melt tank at a temperature appropriate to the particular materials utilized. The polyol and blocking agent will be added and mixed to provide the desired, predetermined ratio of these components to the reaction zone. The polyol-blocking agent mixture may be transferred to the polyol-blocking agent tank 22 by means of a pump 24. The polyol-blocking agent tank 22 is similarly provided with mixing 26, steam service 28 and vent 30 apparatus. The polyol-blocking agent tank serves as a reservoir for these components of the reaction process. A polyisocyanate tank 32 is also provided having suitable mixing 34, venting 36 and filling 38 apparatus, and which similarly serves as a reservoir for the isocyanate component of the reaction process.

The polyol-blocking agent tank 22 is provided with a metering conduit 40 including suitable filters 42, 44 and a metering pump 46. The metering pump directs the polyol-blocking agent mixture to a three-way valve 48, one outlet of which is directed to a recycle line 50 which returns to the polyol blocking agent tank 22. The recycle line 50 includes manual calibration apparatus 52 which may be used to calibrate the flow controlled by the metering pump 46 when the three-way valve 48 is directed so that the recycle line 50 is the only outlet. The other outlet of the three-way valve 48 is the process outlet line 54 which includes appropriate measuring gauges 56. The process outlet line serves as an input feed to a three-way valve 58.

Similarly, the polyisocyanate tank is provided with a polyisocyanate metering conduit 60 including appropriate filters 62, 64 and metering pump 66. The polyisocyanate metering pump 66 similarly feeds into a three-way valve 68 which has as one outlet a recycle line 70 which is directed back into the polyisocyanate tank 32. The polyisocyanate recycle line is also provided with appropriate manual calibration apparatus 72. The other outlet of the three-way isocyanate valve 68 is the isocyanate process outlet line 74 which is similarly provided with appropriate pressure and other measuring apparatus 76. The process outlet line from this isocyanate metering and delivery system serves as the other inlet to the three-way valve 58, the first inlet being the polyol-blocking agent process outlet line 54, as described hereinabove.

Through appropriate adjustment of the respective metering pumps 46 and 66, the polyol-blocking agent component and the polyisocyanate component may, accordingly, be metered in the desired molar ratio to the three-way valve 58 on a continuous and simultaneous basis to provide a reactant feed, mixed in proper predetermined molar proportion, into reactant feed line 78. The reactant feed line discharges into the reaction mixing zone 80 which is a static mixer to intimately mix the isocyanate and blocking agent, the outer surface of which in the illustrated embodiment may be maintained through steam service jacketing 82 at a preselected temperature which may depende on the type of blocking agent employed in the process.

The curing agent reaction mixture is, concomitantly with the introduction of the feed materials into the reaction mixing zone by means of a feed line 78, conducted from the mixing zone 80 by means of a product line 84, to the reaction coils 86 and subsequently cooled and processed. The reaction coils 86 provide reaction residence time, and the reaction mixing zone 80 and the reaction coil zone 86 cooperate to provide appropriate mixing and reaction time-temperature conditions in an over-all continuous process system reaction zone. The blocking agent-polyisocyanate reaction is exothermic, and accordingly provides heat in this reaction zone which may be catalyzed to produce a peak reaction exotherm temperature in the reaction zone. The reaction temperature in the reaction zone, as indicated, will best be maintained at a temperature above the unblocking temperature of the particular blocking agent, and the zone, including the mixing zone 80, product line 84 and reaction coil 86, will be of sufficient volumetric capacity such that at the introduction rate of the reactant feed from the line 78, the reaction mixture will be maintained in the reaction zone for a sufficient length of time to provide for substantial completion of the polyisocyanate-blocking agent reaction in respect of the cooled reaction product. Substantial completion of the reaction is indicated by the presence of less than 2%, and preferably, less than 1%, of unreacted blocking agent, based on the original molar amount of blocking agent used as a reactant starting material. Generally, the reactants will be maintained in the reaction zone for a period of time in the range of from about 15 to about 300 seconds, and the volume of the reaction zone and the metering rate of the reactants will be adjusted to provide for an appropriate reaction zone retention time.

Of course, the reaction mixture should not be held at high reaction temperature and for long residence time conditions which are overly deleterious to the final product; for example, for methyl ethyl ketoxime blocked isocyanates, the reaction should not be held for longer than 90 seconds at 280°-320° F because of development of dark color.

The finished product may be discharged from the coil 86 to a cooling belt for cooling and subsequent processing of the partially blocked curing agent, as will be described in more detail hereinafter.

The manufacturing apparatus 10 is particularly adapted to carry out a preferred aspect of the present invention in which the final product is a partially blocked isocyanate-polyol prepolymer, and in which the blocking agent, isocyanate, and the polyol are simultaneously metered and reacted together in the reaction zone. It will be appreciated that separate metering and delivery systems might be provided for the polyol component and the blocking agent component, respectively, but such an approach adds metering equipment to the system, the use of which can be avoided by premixing these components. However, partially blocked polyolisocyanates may also be manufactured through the use of a preformed polyol-isocyanate prepolymer.

In the preformed prepolymer approach, the desired stoichiometric excess of isocyanate is first reacted with a polyhydric alcohol to produce an isocyanate-capped prepolymer of desired molecular weight and properties. This reaction may be continuous, or may be performed in a batch manner, and, like the blocking agent reaction, may be catalyzed through the use of a suitable reaction catalyst. The prepolymer reaction product is subsequently continuously reacted with the blocking agent under conditions in accordance with the present invention. For example, in the prepolymer method, isophorone diisocyanate may be reacted with trimethylol propane in a molar ratio of, say, about 3:1 under appropriate elevated temperature condition to provide upon completion of the urethane-linkage formation reaction, a prepolymer which is substantially trifunctional in respect of isocyanate reactivity. The prepolymer and epsilon-faprolactam blocking agent, in the stoichiometrically correct ratio based on the prepolymer isocyanate functionality (and including a suitable catalyst), may, for example, be continuously introduced, mixed and maintained for 60–90 seconds residence time in a reaction zone at a suitable reaction temperature to produce the partially blocked polyisocyanate curing agent.

However, in view of the fact that the prepolymer is more viscous than the polyol and isocyanate components, and, in view of the difficulties in processing the more viscous prepolymer, it is preferred, as indicated hereinabove, that the blocking agent, polyol and polyisocyanate be continuously and simultaneously mixed and reacted without first forming the prepolymer (hereinafter referred to as the "one shot" method). In the one shot method, for example, isophorone diisocyanate may be used as one reaction component stream, and a trimethylol propane-epsilon caprolactam mixture may be used as the other reaction component stream, and each component may be heated to a suitable temperature for processing (e.g., about 100° F for the isophorone diisocyanate and about 225° F for the trimethylol propane-epsilon caprolactam mixture). Dibutyl tin dilaurate is added to the trimethylol propane-epsilon caprolactam mixture. The two component streams may be brought together by proportionating pumps in the desired mix ratio, held in a reaction zone (e.g., for about 90 seconds residence time) at elevated temperature (e.g., a peak reaction exotherm temperature of about 390 –400° F.) to produce the epsilon caprolactam partially blocked curing agent product. Comparison of processing with epsilon caprolactam vs. methyl ethyl ketoxime as the blocking agent indicates that the methyl ethyl ketoxime blocking agent does not require as long a residence time (e.g., to reduce free isocyanate content below a predetermined level) as the epsilon caprolactam when using trimethylol propane and isophorone diisocyanate as the other reaction components. However, the peak exotherm reached by each curing agent is important in the completion of the reaction with the blocking agent. A longer residence time and lower temperature may also be utilized to complete the reaction and to reach the desired final unreacted isocyanate content of the partially blocked curing agent. An optimum combination of utilizing the exothermix heat of reaction to establish a peak exothermic temperature, and controlling the residence time in the reaction zone is desirable for producing epsilon caprolactam and methyl ethyl ketoxime blocked products. To hasten the reaction to reach a peak exotherm, a suitable catalyst such as dibutyl tin dilaurate may be used, and such catalysts may be premixed with the blocking agent or blocking agent-polyol components. The peak exotherm reached may be substantially higher than the unblocking temperature for each curing agent, but has not been found to be detrimental to the finished product.

As indicated, the remaining unblocked isocyanate functionality of the partially blocked isocyanate curing agent may be employed in selective reaction with a hydroxy functional coating composition polymer. In this connection, the partially blocked isocyanate may be continuously mixed with a suitable hydroxy functional polymer in a predetermined molar ratio and reacted therewith at a reaction temperature below the unblocking temperature of the blocking agent. Suitable hydroxy functional polymer suitable for coating composition use are known, and will best have a reactive hydroxyl content represented by a hydroxyl value of about 80 or more, and preferably in the range of from about 80 to about 250 Particularly preferred hydroxy functional prepolymers are alkyd resins, polyester resins and hydroxy functional acrylic polymers and copolymers. Such materials will generally have glass transition temperatures below 40° C; at ambient temperatures, such materials usually are very viscous, tacky, semisolids. Furthermore, the hydroxy functional polymers should best have an equivalent wight of between about 225 and about 700 and should best have at least two to twenty hydroxyl groups, on the average, per molecule.

The number ratio of free and blocked polyisocyanate goups to hydroxyl groups is the final composition (NCO to OH ratio) will best generally range from about 0.8 to 1.2.

A convenient way to conduct the curing agent hydroxyfunctional polymer reaction is to continuously introduce the curing agent and hydroxy functional material in the desired proportion into and through an extruder such as Buss K-Kneader, maintained at an extruder barrel temperature in the range of from about 65° C to about 125° C, and preferably about 110° C. Appropriate coating composition additives such as pigments, flow control agents, stabilizers, etc. may also be mixed and coextruded, and the finished reaction product, which should have a glass transition temperature of at least 50° C and preferably in the range of from about 60° C to about 70° C, may be subsequently reduced in particle size (e.g., so as to pass through a 200 mesh screen) to provide a high quality storage stable heat curable powder coating composition.

The following examples illustrate various aspects of the present invention:

EXAMPLE 1

A blocked isocyanate prepolymer curing agent is prepared by continuously introducing a mixture of trimethylol propane (TMP) and epsilon caprolactam (E-Cap) as one input feed to a reaction zone (the "A" side) and simultaneously and continuously introducing isophorone diisocyanate (IPDI) as the other input feed to the reaction zone (the "B" side), in the following reactant ratio. The IPDI component was heated to 100° F before introduction into the reaction zone, and the TMP (E-Cap) mixture was similarly preheated to 225° F. 0.15 parts by weight of dibutyl tin dilaurate (D-22) catalyst was added to catalyze the reaction. The peak temperature reached in the reaction zone is 350° F after 75 seconds have elapsed. The reactant ratio is as follows:

| Materials | Moles | Equivalents | Eq. Wt. | Charge | Wt. % | |
|---|---|---|---|---|---|---|
| TMP | 1 | 3 | 45 | 135 | 9.16) | |
| E-Cap | 3.0 | 3 | 113 | 339 | 23.02) | A side |
| IPDI | 4.5 | 9 | 111 | 999 | 67.82) | B side |
| | | | | 1,473 | 100.00 | |

Final properties of the partially blocked curing agent produced are as follows:

| Final Properties | |
|---|---|
| Free NCO-Wt.% | 8.2 |
| Sag Temperature[1] | 165° F |
| Softening Point[1] | 187° F |
| Color[2] (50% solution in xylol) | Less than 1 |

[1]Ring and ball apparatus
[2]Gardner-Holdt color standards

EXAMPLE 2

A blocked isocyanate prepolymer curing agent is prepared in substantially the same manner as in Example 1 from a mixture of trimethylol propane (TMP) and epsilon caprolactam (E-Cap) as one input stream (the "A side") and isophorone diisocyanate (IPDI) as the other metered input stream (the "B side") in the following reactant proportions:

| Materials | Moles | Equivalents | Eq. Wt. | Charge | Wt. % | |
|---|---|---|---|---|---|---|
| TMP | 1 | 3 | 45 | 135 | 4.80) | |
| E-Cap | 6.0 | 6 | 113 | 678 | 24.12) | A side |
| IPDI | 9.0 | 18 | 111 | 1,998 | 71.08) | B side |
| | | | | 2,811 | 100.00 | |

Final properties of the partially blocked curing agent produced are as follows:

| Final Properties | |
|---|---|
| Free NCO-Wt. % | 13.2 |
| Sag temperature[1] | 147° F |
| Softening Point[1] | 173° F |
| Color[2] (50% solution in xylol) | Less than 1 |

[1]Ring and ball apparatus
[2]Gardner-Holdt color standards

EXAMPLE 3

A blocked isocyanate prepolymer curing agent is prepared in substantially the same manner as in Example 1 from a mixture of trimethylol propane (TMP) and epsilon caprolactam (E-Cap) as one input stream (the "A side") and toluene diisocyanate (TDI) as the other metered input stream (the "B side") in the following reactant proportions:

| Materials | Moles | Equivalents | Eq. Wt. | Charge | Wt. % | |
|---|---|---|---|---|---|---|
| TMP | 1 | 3 | 35 | 135 | 10.74) | |
| E-Cap | 3.0 | 3.0 | 113 | 339 | 26.97) | A side |
| TDI | 4.5 | 9.0 | 87 | 783 | 62.29 | B side |
| | | | | 1,257 | 100.00 | |

Final properties of the partially blocked curing agent produced are as follows:

| Final Properties | |
|---|---|
| Free NCO-Wt.%[1] | 8.2 |
| Sag temperature[1] | 170° F |
| Softening point[1] | 196° F |
| Color[2] (50% solution in xylol) | Less than 1 |

[1] Ring and ball apparatus
[2] Gardner-Holdt color standards

EXAMPLE 4

A blocked isocyanate prepolymer curing agent is prepared in substantially the same manner as in Example 1 from a mixture of glycerine and epsilon caprolactam (E-Cap) as one input stream (the "A side") and isophorone diisocyanate (IPDI) as the other metered input stream (the "B side") in the following reactant proportions:

| Materials | Moles | Equivalents | Eq. Wt. | Charge | Wt.% | |
|---|---|---|---|---|---|---|
| Glycerine | 1 | 3 | 31 | 93 | 6.50) | |
| E-Cap | 3.0 | 3 | 113 | 339 | 23.69) | A side |
| IPDI | 4.5 | 9 | 111 | 999 | 69.81) | B side |
| | | | | 1,431 | 100.00 | |

Final properties of the partially blocked curing agent produced are as follows:

| Final Properties | |
|---|---|
| Free NCO-Wt. % | 8.2 |
| Sag temperature[1] | 160° F |
| Softening point[1] | 178° F |
| Color[2] (50% solution in xylol) | Less than 1 |

[1] Ring and ball apparatus
[2] Gardner-Holdt color standards

EXAMPLE 5

A series of paint formulations is prepared utilizing the partially blocked curing agents of Examples 1 through 4 by coextruding the partially blocked materials with hydroxy functional polymer coating composition. The compositions are homogeneously preblended in powder form and passed through a BUSS Kneader extruder model PR-46 having an 18 inches barrel, at an extruder barrel reaction zone temperature of about 110° C. The components of the formulations, in parts by weight, are as follows:

| COMPONENT | PAINT FORMULAS | | | |
|---|---|---|---|---|
| | 1 | 2 | 3 | 4 |
| CARGILL POLYESTER 6603[a] | 600.0 | 650.0 | 630.0 | 600.0 |
| R-900[b] | 500.0 | 500.0 | 500.0 | 500.0 |
| L-5310[c] | 7.3 | 7.3 | 7.3 | 7.3 |
| Product of Example 1 | 400.0 | — | — | — |
| Product of Example 2 | — | 350.0 | — | — |
| Product of Example 3 | — | — | 370 | — |
| Product of Example 4 | — | — | — | 400 |

[a] A polyester of Cargill, Inc. derived from TMP, neopentyl glycol, adipic acid and isophthalic acid having an equivalent weight of about 350 and a hydroxyl value of about 160.
[b] Rutile titanium dioxide from DuPont.
[c] Silicone surfactant flow control agent from Union Carbide.

The reacted and extruded paint formulations are each respectively powdered, and the powdered formulations are tested as powder coating compositions with a bake cycle of 30 minutes at 360° F. The resulting film performance results are as follows:

| | FILM PERFORMANCE | | | |
|---|---|---|---|---|
| | Paint Formula | Paint Formula | Paint Formula | Paint Formula |
| Gloss 60° | 81 | 86 | 80 | 83 |
| 20° | 54 | 60 | 52 | 57 |
| Pencil Hardness | 2H | 2H | 2H | 2H |
| Flexibility, T-bend | 2T | 2T | 2T | 2T |
| Impact, Aluminum | | | | |
| Direct | 50 | 40 | 50 | 50 |
| Reverse | 50 | 40 | 50 | 50 |
| Impact, Bond 1,000 | | | | |
| Direct | 150 | 120 | 150 | 150 |
| Reverse | 150 | 120 | 140 | 140 |
| Film Appearance | slight orange peel | slight orange peel | slight orange peel | slight orange peel |
| 100 MEK Double Rubs | No loss of gloss | No loss of gloss | No loss of gloss | No loss of gloss |

It will be appreciated that in accordance with the present invention, an improved method for the production of partially blocked isocyanate curing agents has been provided as well as an improved method for producing storage stable, hydroxy functional thermosetting powder coating compositions. While the invention has been particularly described with respect to a number of specific embodiments, it will also be appreciated that various modifications thereof will be apparent to those skilled in the art and are intended to be included in the spirit and scope of the present invention.

Various of the features of the present invention are set forth in the following claims.

What is claimed is:

1. A method for manufacturing partially blocked isocyanate curing agents which are the reaction product of a polyfunctional isocyanate and a blocking agent for the isocyanate which is capable of splitting from the curing agent at elevated temperature to regenerate isocyanate functionality, comprising the steps of
    separately and continuously metering a polyisocyanate and a blocking agent for said polyisocyanate into a reaction zone in predetermined stoichiometric isocyanate excess to provide a reaction mixture in the reaction zone at reaction temperature,
    continuously withdrawing the reaction mixture from said reaction zone to provide a partially blocked isocyanate curing agent reaction product after maintaining said reaction mixture in the reaction zone for a time sufficient to reduce the free isocyanate content of the reaction product to at least a predetermined level indicating substantial completion of the reaction.

2. A method in accordance with claim 1 wherein said blocking agent is selected from the group consisting of epsilon caprolactam, and methyl ethyl ketoxime.

3. A method in accordance with claim 1 wherein said polyisocyanate is selected from the group consisting of isophorone diisocyanate, toluene diisocyanate, isocyanate polyol prepolymers and mixtures thereof.

4. A method in accordance with claim 1 wherein said isocyanate is an isocyanate polyol prepolymer.

5. A method in accordance with claim 1 wherein a polyol is metered into said reaction zone simultaneously with said polyisocyanate and said blocking agent and wherein said excess isocyanate functionality is calculated to account for the reaction of said polyisocyanate with said polyol.

6. A method in accordance with claim 1 wherein said reaction mixture is maintained in said reaction zone for a period of time in the range of from about 15 to about 300 seconds.

7. A method in accordance with claim 1 wherein said reaction zone is maintained at a temperature in the range of from about 250 to about 400° F.

8. A method in accordance with claim 1 wherein said partially blocked isocyanate reaction product is further reacted with a hydroxy functional coating composition polymer at a temperature below the unblocking temperature of said blocking agent in respect of said polyisocyanate to produce a thermosettable coating composition, and wherein said coating composition is powdered to provide a powder coating composition.

9. A method in accordance with claim 1 wherein a catalyst is employed to generate a peak reaction exotherm reaction in the reaction zone.

10. A method in accordance with claim 1 wherein a reaction temperature above the unblocking temperature of said blocking agent in respect of said polyisocyanate is maintained in said reaction zone.

11. A method in accordance with claim 1 wherein an effective reaction time and temperature below the unblocking temperature of said blocking agent in respect of said polyisocyanate is maintained in said reaction zone.

* * * * *